United States Patent [11] 3,602,379

| [72] | Inventor | Wilbert A. W. Bosse |
| | | Cincinnati, Ohio |
| [21] | Appl. No. | 836,802 |
| [22] | Filed | June 26, 1969 |
| [45] | Patented | Aug. 31, 1971 |
| [73] | Assignee | The Crosset Company Inc. |
| | | Cincinnati, Ohio |

[54] MATERIALS HANDLING DEVICE
8 Claims, 25 Drawing Figs.

| [52] | U.S. Cl. | 214/16.4 B |
| [51] | Int. Cl. | B65g 1/06 |
| [50] | Field of Search | 214/16.4, 16.42; 104/48 |

[56] References Cited
UNITED STATES PATENTS

| 1,610,366 | 12/1926 | Fox | 104/48 |
| 2,509,788 | 5/1950 | Smith | 104/48 |
| 2,714,456 | 8/1955 | Manaugh | 214/16.1 (8-B) |
| 2,919,657 | 1/1960 | Wack | 104/48 |
| 2,951,599 | 9/1960 | Bogar | 214/16.1 (8-B) |
| 3,021,795 | 2/1962 | Hayba et al. | 104/48 |
| 3,174,634 | 3/1965 | Peck | 214/75 |
| 3,206,041 | 9/1965 | McGrath | 214/8.5 (D) |
| 3,214,934 | 11/1965 | Taylor et al. | 214/16.4 (2) |
| 3,485,390 | 12/1969 | Atwater | 214/16.4 (2) |
| 3,503,530 | 3/1970 | Burch et al. | 214/16.4 (2) |

FOREIGN PATENTS

| 1,252,821 | 12/1960 | France | 214/16.1 (8-B) |
| 123,458 | 2/1947 | Great Britain | 104/48 |
| 992,513 | 5/1965 | Great Britain | 214/16.4 (2) |

*Primary Examiner*—Gerald M. Forlenza
*Assistant Examiner*—Raymond B. Johnson
*Attorney*—Melville, Strasser, Foster & Hoffman

ABSTRACT: A materials handling device for depositing and removing materials from storage means. The storage means comprise a plurality of superposed racks or the like arranged in parallel rows with access aisles therebetween and at least one transfer aisle extending transversely of the access aisles. The device comprises a carriage movably supported on elevated rails extending along the transfer aisle. The carriage carries a stacker assembly capable of leaving the carriage and traveling along elevated rails in the access aisles. The stacker assembly comprises elevator means having an extensible dolly capable of being inserted into any of the racks on either side of any of the access aisles at any vertical level above or below the elevated rails in the access aisles.

PATENTED AUG 31 1971

INVENTOR
WILBERT A.W. BOSSE,

BY Melville, Strasser, Foster and Hoffman
ATTORNEYS

INVENTOR/S
WILBERT A.W. BOSSE,
BY Melville, Strasser, Foster and Hoffman
ATTORNEYS

MATERIALS HANDLING DEVICE

BACKGROUND OF THE INVENTION

1. Field of the Invention

The invention relates to a materials handling device and more particularly to a device for depositing and removing materials from parallel rows of superposed storage racks, the device being capable of moving along a vertical axis, a first horizontal axis and a plurality of additional horizontal axes perpendicular to said first axis.

2. Description of the Prior Art

In modern industry, it has become necessary to store large quantities of materials of all descriptions, whether they be starting materials, parts, finished products or the like. Where conditions permit, it is the usual practice to arrange in a large enclosed area a plurality of storage means with access aisles therebetween. These storage means extend from the floor to the ceiling of the enclosed area.

In such a storage area, particularly where the materials being stored are too heavy to be manipulated by hand or too high to be reached from the floor, it is necessary to provide means whereby the materials may be readily deposited in and removed from the storage means, as required. The provision of an adequate materials handling device in such a storage area has constituted a major problem, and is the problem to which the present invention is addressed.

Prior art workers have posed a number of solutions to this problem, but all of these solutions are characterized by certain drawbacks or deficiencies. For example, it is common practice to use a series of fork lift trucks or the like. However, this means that a driver is required for each vehicle; the access aisles are cluttered with such vehicles; and the access aisles between the storage means must be sufficiently spaced from each other to enable the adequate maneuvering of such vehicles, resulting in a waste of valuable storage space.

Prior art workers have also developed a number of different retrieving devices. Such devices are either supported on tracks in the floors of the access aisles and are guided from above, or they are suspended from overhead rails in the access aisles and are guided from the floor. In either event, it is generally required that such a retrieving device be provided for each aisle. This necessitates a duplication of expensive equipment; requires an operator for each retriever; and again restricts the freedom of the aisles for workers and the like.

Yet another solution to the problem has been employed by prior art workers and entails the use of an overhead crane carrying materials handling means. Such an arrangement has the advantage of enabling a single materials handling means to be used in a number of access aisles because the overhead crane will permit cross travel of the materials handling means from aisle to aisle.

The use of an overhead crane, however, precludes the provision of storage means extending from the floor to the ceiling of the enclosed area, thus resulting in the loss of a great deal of valuable storage space.

The problem of providing an adequate materials handling means is made particularly acute when the materials being handled are food stuffs or other materials requiring refrigeration, or special conditions of temperature, humidity and the like. In the storage of such materials, it is often desirable to enclose a number of the storage means in separate rooms wherein temperature, humidity and the like may be differently controlled. Heretofore, this entailed the use of separate materials handling devices for each such room or enclosure. For example, it will be readily understood by one skilled in the art that an overhead crane-type materials handling device could not be used with a plurality of enclosures because such enclosures would have to be open at the top.

The materials handling device of the present invention is capable of solving the aforementioned problems and is not characterized by the above mentioned deficiencies. The materials handling device of the present invention allows all of the access aisles to be free to work in and is capable of passing in and out of a plurality of separate enclosures or rooms. In addition, the device of the present invention enables ready access to all of the storage means and may be run by a single operator.

SUMMARY OF THE INVENTION

The materials handling device of the present invention is adapted for use in association with a plurality of storage means located in parallel rows with parallel access aisles therebetween. Certain of the storage means may be enclosed so that their environmental conditions may be controlled. All of the access aisles should be traversed by at least one transfer aisle extending perpendicular thereto.

The materials handling means of the present invention comprises a carriage adapted to travel along elevated rails in the transfer aisle and capable of being indexed and secured in alignment with any of the access aisles. The carriage carries a stacker assembly normally secured on the carriage but capable of leaving the carriage and moving along elevated rails in the access aisles. The stacker assembly comprises a frame member supporting an elevator carrying a dolly. The elevator is capable of orienting the dolly at any vertical level within the access aisles, above or below the elevated rails. The dolly itself is extensible transversely of the access aisles so that it may be inserted into any of the storage means on either side of any of the access aisles.

The materials handling device of the present invention may be moved and powered by any suitable means such as electric motors or the like.

DESCRIPTION OF THE PREFERRED EMBODIMENTS

Figure 1:
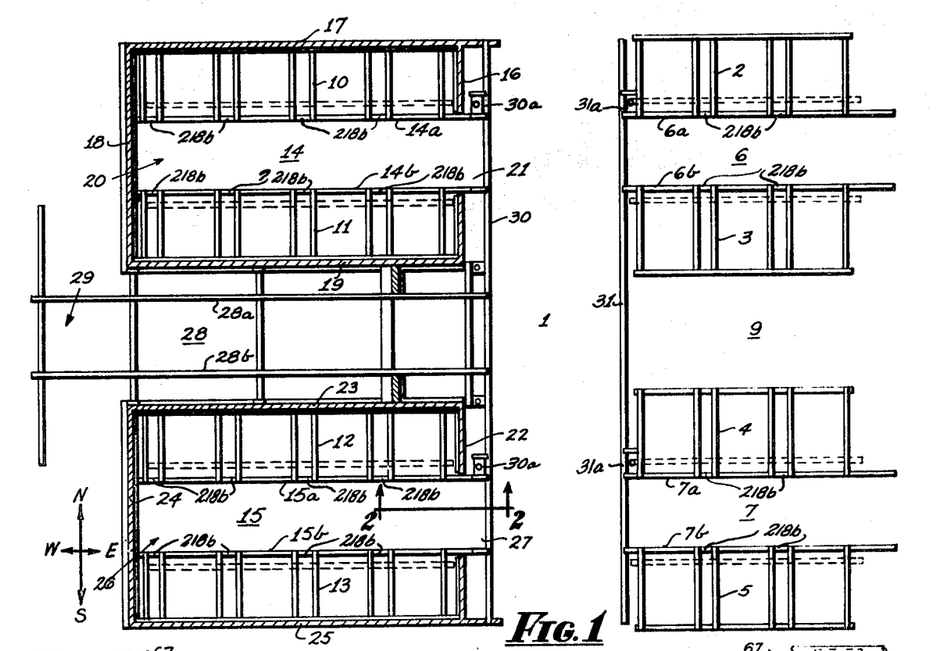
FIG. 1 is a plan view, partly in cross section, of an exemplary arrangement of storage means and illustrates the transfer aisle and the access aisles.

FIG. 1 is a plan view of an exemplary, but nonlimiting arrangement of storage means which may be located in an enclosed area such as a factory, warehouse or the like (not shown). For purposes of an exemplary showing, north, south, east and west directions are indicated in the lower left-hand corner of the Figure.

FIG. 1 illustrates a transfer aisle (generally indicated at 1) extending in a north-south direction. To the east of the transfer aisle there is shown a plurality of storage means 2 through 5, arranged in parallel rows with access aisles 6 and 7 therebetween. The space between storage means 3 and 4 may constitute yet another access aisle. For purposes of an exemplary illustration, however, this space is illustrated simply as a corridor 9 and is not intended to be served by the materials handling device of the present invention.

It will be understood by one skilled in the art that the length of the storage means 2 through 5 and the number of such storage means with intervening access aisles does not constitute a limitation on the present invention. The materials handling device is capable of serving any number of such storage means, of any length.

On the west side of transfer aisle 1, four additional storage means 10 through 13 are illustrated. Storage means 10 and 11 are separated by an access aisle 14 and storage means 12 and 13 are similarly separated by an access aisle 15. The storage means 10 and 11, together with aisle 14, are surrounded by walls 16 through 19, forming a chamber generally indicated at 20. As illustrated, the access aisle 14 connects with the transfer aisle 1 through an opening 21 in the wall 16.

In similar manner, the storage means 12 and 13, together with the access aisle 15, are enclosed by walls 22 through 25, forming a chamber generally indicated at 26. Again, the access aisle 15 connects with the transfer aisle 1 through opening 27 in the wall 22.

The openings 21 and 27 in the chambers 20 and 26, respectively, may be provided with closure means, more fully described hereinafter. As a consequence, conditions within the chambers 20 and 26, such as temperature, humidity and the like, may be controlled. For example, when intended for the storage of food stuffs and the like, the chambers 20 and 26 may be refrigerated.

Again it will be understood by one skilled in the art that there is no limit to the number of storage means or chambers which can be served by the materials handling means of the present invention. Similarly, open storage means and enclosed storage means may be located on either side of the transfer aisle 1.

Again, for the purposes of an exemplary illustration, chambers 20 and 26 are illustrated as being separated by a corridor 28 leading to an area generally indicated at 29. At 29, materials to be stored may be delivered to the materials handling device. Similarly, stored materials may be removed from the storage means and delivered to the area 29 by the materials handling device Thus, the area 29 may be of the nature of a loading an unloading dock, or the like. Similar loading and unloading facilities may be located at other points in the general floor plan. For example, unloading and loading facilities could be located at the north and south ends of the transfer aisle 1.

As will be more fully described hereinafter, the materials handling device of the present invention comprises two basic parts. The first part is a carriage intended to run along the transfer aisle 1. The carriage, in turn, carries a stacker. Thus, the carriage can deliver the stacker to any point along the transfer aisle 1. The stacker, in turn, is capable of leaving the carriage and traveling in an east-west direction along any of the access aisles 6, 7, 14 and 15, or the corridor 19 to the area 29.

As a consequence, the transfer aisle 1 is provided with a pair of elevated carriage rails 30 and 31 extending the full length thereof. The carriage is adapted to run along the rails 30 and 31.

The various access aisles 6, 7, 14 and 15 are each provided with pairs of stacker rails 6a–6b, 7a–7b, 14a–14b, and 15a–14b, respectively. Similarly, the corridor 28 is provided with stacker rails 28a and 28b. It is on these last-mentioned rails, in the access aisles and the corridor 28, that the stacker is intended to travel in an east-west direction when it leaves the carriage. In this way, the stacker may be delivered by the carriage along transfer aisle 1 to any of the access aisles or the corridor 28. When the desired east-west aisle is reached and the carriage is secured in alignment therewith, the stacker may leave the carriage and enter the aisle. Again, as will be fully described hereinafter, the stacker comprises a frame having an elevator carrying an extensible dolly. Thus, the stacker may be run to any desired storage rack in any of the storage means. By means of the elevator, the dolly can be raised or lowered to any desired vertical position. Finally, the dolly may be extended in either a north or south direction to pick up or deposit materials on any rack on either side of the access aisle. Having either picked up or deposited a load the elevator and dolly will be returned to their respective normal running positions in the frame and the stacker may be returned to the carriage in the transfer aisle and secured thereon. Thereafter the stacker may be delivered by means of the carriage to the next desired east-west aisle or corridor.

Figures 2, 3, 4, 5:
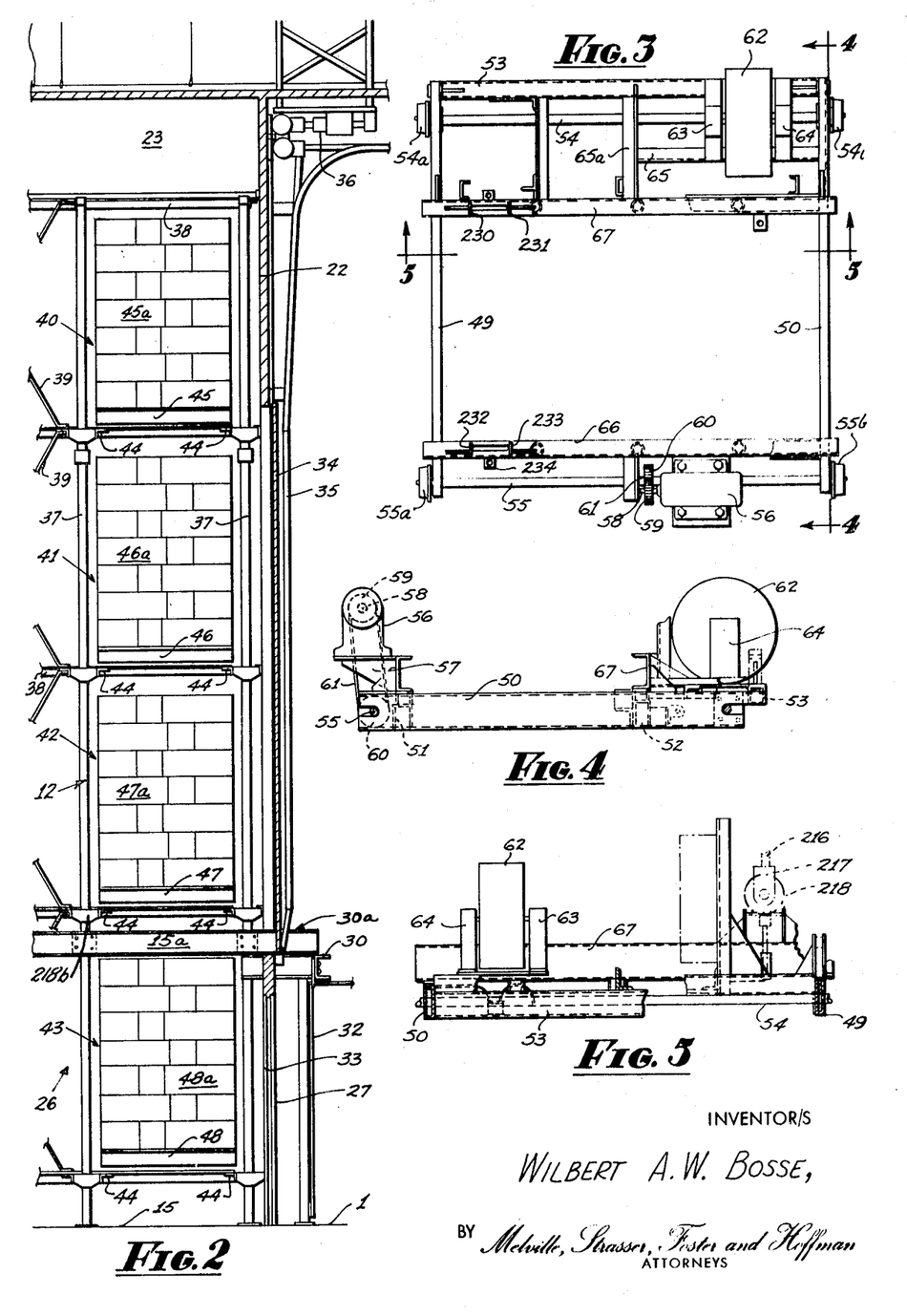
FIG. 2 is a cross-sectional elevational view taken along the section line 2—2 of FIG. 1.
FIG. 3 is a plan view of the carriage of the materials handling device of the present invention.
FIG. 4 is a cross-sectional view of the carriage taken along section lines 4—4 of FIG. 3.
FIG. 5 is a cross-sectional view of the carriage taken along section line 5—5 of FIG. 4.

FIG. 2 is a fragmentary cross-sectional view taken along the section 2—2 of FIG. 1. Thus, FIG. 2 is a sectional view through the opening 27 of chamber 26. FIG. 2 illustrates transfer aisle 1, access aisle 15, chamber 26 and storage means 12. The figure additionally illustrates walls 22 and 23 of the chamber 26.

While the invention is not so limited, all of the carriage rails and stacker rails are preferably channel shaped in cross section and are adapted to receive the carriage wheels and the stacker wheels respectively. Carriage rail 30 is shown in FIG. 2, supported in an elevated position by support means 32. While the distance from rail 30 to the floor does not constitute a limitation on the present invention, the distance is preferably sufficient to enable workmen to walk beneath the rail and the materials handling device with adequate clearance.

One of the stacker rails 15a is shown in FIG. 2. It will be noted that the rail 15a is located slightly above the carriage rail 30. The carriage (as will be described hereinafter) carries a pair of rails on which the stacker rests. These rails on the carriage can be brought into positions wherein they are coextensive with any of the pairs of stacker rails 6a–6b, 7a–7b, 14a–1415a–15b and 28a–28b.

That portion of the opening 27 of the chamber 26 lying below the stacker rails may be closed by a conventional door means 33. It will be understood that the door 33 may be an insulated refrigerator type door if desired.

That portion of the opening 27 in the chamber 26 located above the stacker rails may be closed by additional door means such as a sectional, sliding overhead door 34 having means (not shown) riding in door tracks 35. The overhead door 34 may be powered by conventional prime mover means, generally indicated at 36.

As indicated above, the storage means 2 through 5 and 10 through 13 may be of any suitable type. For purpose of an exemplary illustration, storage means 12 is illustrated in FIG. 2 as being rack means comprising a plurality of vertical frame members 37, horizontal frame members 38 and diagonal frame members 39. This framework assembly forms a plurality of vertical rows of storage cubicles. The cubicles of one such row are indicated at 40 through 43. It will be noted that the cubicles 40 through 42 are located above the stacker rail 15a and the cubicle 43 is located therebelow. All of the cubicles are provided with pairs of pallet-supporting rails 44. For purposes of illustration, four pallets 45 through 48 with loads 45a through 48a, respectively, are shown in place in the cubicles 40 through 43. It will be understood that the remaining storage means of FIG. 1, on both sides of the transfer aisle 1, together with the stacker and carriage rails, may be substantially identical to those illustrated in FIG. 2.

FIGS. 3, 4, and 5 illustrate the carriage of the present invention. The carriage is of open framework construction and comprises side frames 49 and 50 joined together by transverse frame members 51, 52 and 53. The side frames 49 and 50 support in suitable bearing means, axles 54 and 55. The axle 54 carries wheels 54a and 54b, while the axle 55 carries wheels 55a and 55b. The wheels 54a–55a and 54b–55b are adapted to ride in the channel-shaped carriage rails 30 and 41 respectively in the transfer aisle.

The carriage may be moved along the rails 30 and 31 by any suitable type of conventional prime mover. For purposes of an exemplary showing, an electric motor 56 is shown as being mounted on bracket means 57 which, in turn, is supported by the frame member 51. The electric motor 56 has a shaft 58 bearing a sprocket 59. The axle 55 has a similar sprocket 60 splined or otherwise attached thereto. The sprockets 59 and 60 are joined by an endless belt-chain 61 whereby rotation of the motor shaft 58 is transferred to the axle 55 enabling the electric motor 56 to power the carriage.

The electric motor 56 may be run by batteries. On the other hand, it may be connected by cable (not shown) to a power source (not shown) located, for example, at the north end of the transfer aisle. When a cable is used, the carriage may be provided with a cable drum 62 rotatively mounted between a pair of upright members 63 and 64. The members 63 and 64, inturn, are mounted on the frame member 53 and an additional frame member 65. One end of the frame member 65 is affixed to the side frame 50. The other end of frame member 65 is affixed to a frame element 65a extending between transverse frame members 52 and 53. The drum 62 ill pay out and take up cable as the carriage moves back and forth in the transfer aisle.

The carriage side frames 49 and 50 and the transverse frame members 51 and 52 carry channel-shaped rails 66 and 67. The stacker (to be described hereinafter) has wheels adapted to lie within the channel-shaped rails 66 and 67. The rails 66 and 67 are spaced apart by the same distance as those pairs of stacker rails 6a–6b, 7a–7b, 14a–14b, 15a–15b and 28a–28b. Thus, the carriage may be moved along the transfer aisle and the rails 66 and 67 may be brought into matching relationship with any of the above mentioned pairs of stacker rails.

Figure 6:
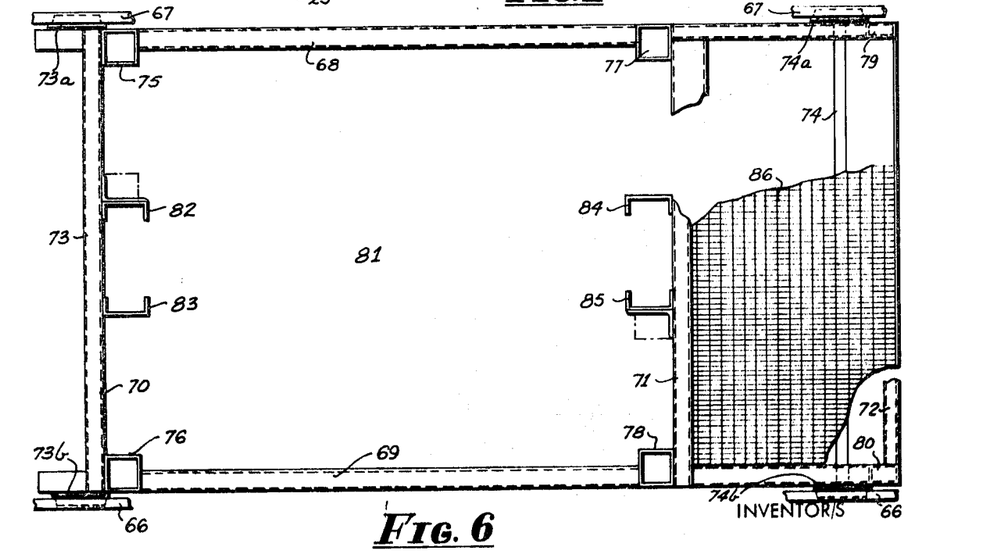
FIG. 6 is a plan view, partly in cross section, of the stacker assembly of the present invention.

The stacker assembly is illustrated in FIGS. 6 through 9. FIG. 6 is a plan view of the bottom portion of the stacker frame. The bottom portion of the stacker frame comprises side frame members 68 and 69 joined together by transverse frame members 70, 71 and 72. Axles 73 and 74 are mounted in suitable bearing means on the side frames 68 and 69. Axle 73 bears wheels 73a and 73b, and axle 74 bears wheels 74a and 74 b. The wheels 73a–74a and 73b–74b are adapted to be received within any of the pairs of channel-shaped stacker rails mentioned above. For purposes of an exemplary illustration, wheels 73a and 74a are illustrated as engaging the rail 67 on the carriage. Similarly, wheels 73b and 74b are illustrated as engaging the rail 66 on the carriage.

Figures 7, 8:
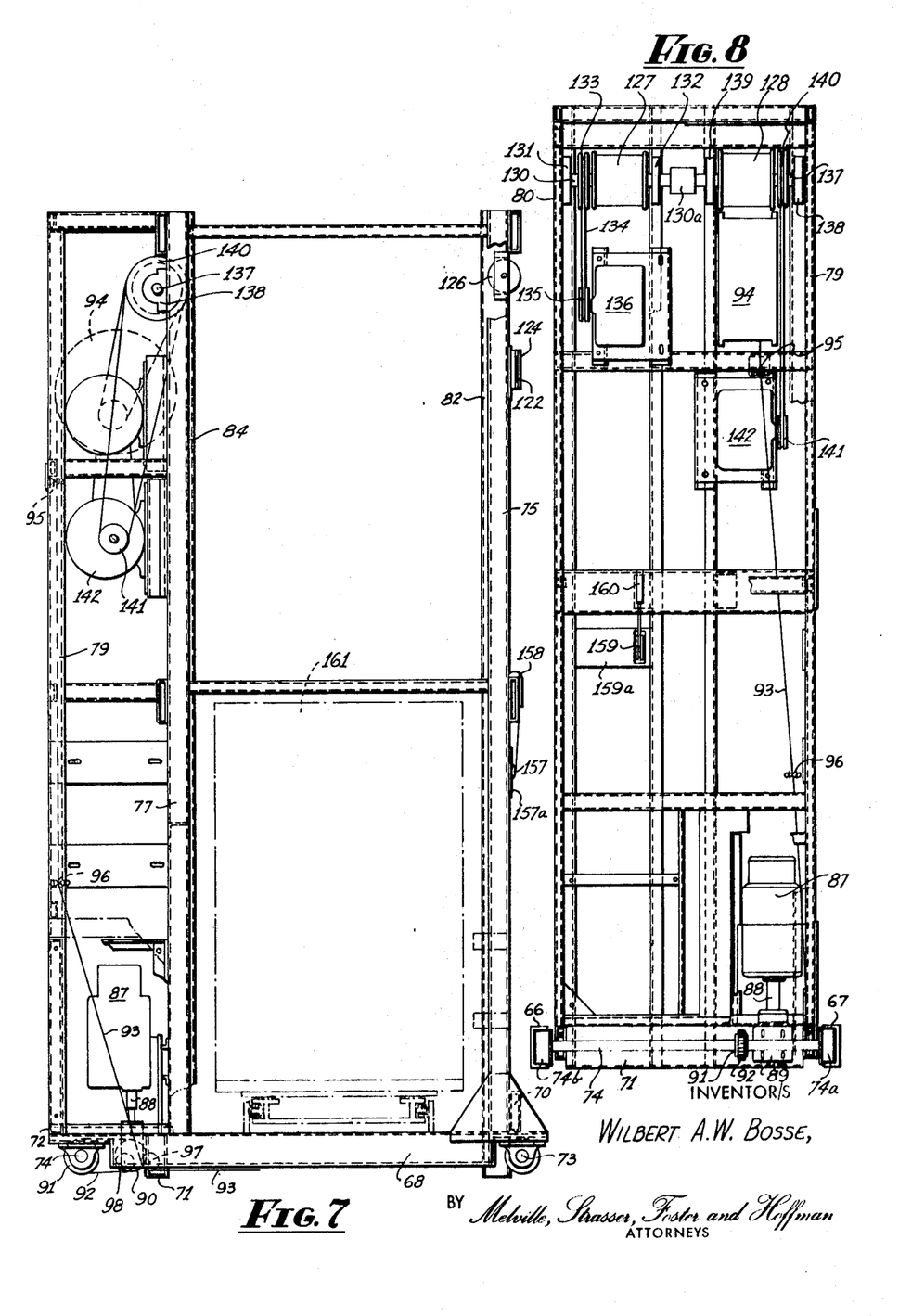
FIG. 7 is a side elevational view of the stacker of the present invention.
FIG. 8 is an elevational view of one end of the stacker assembly.
Figures 9, 10:
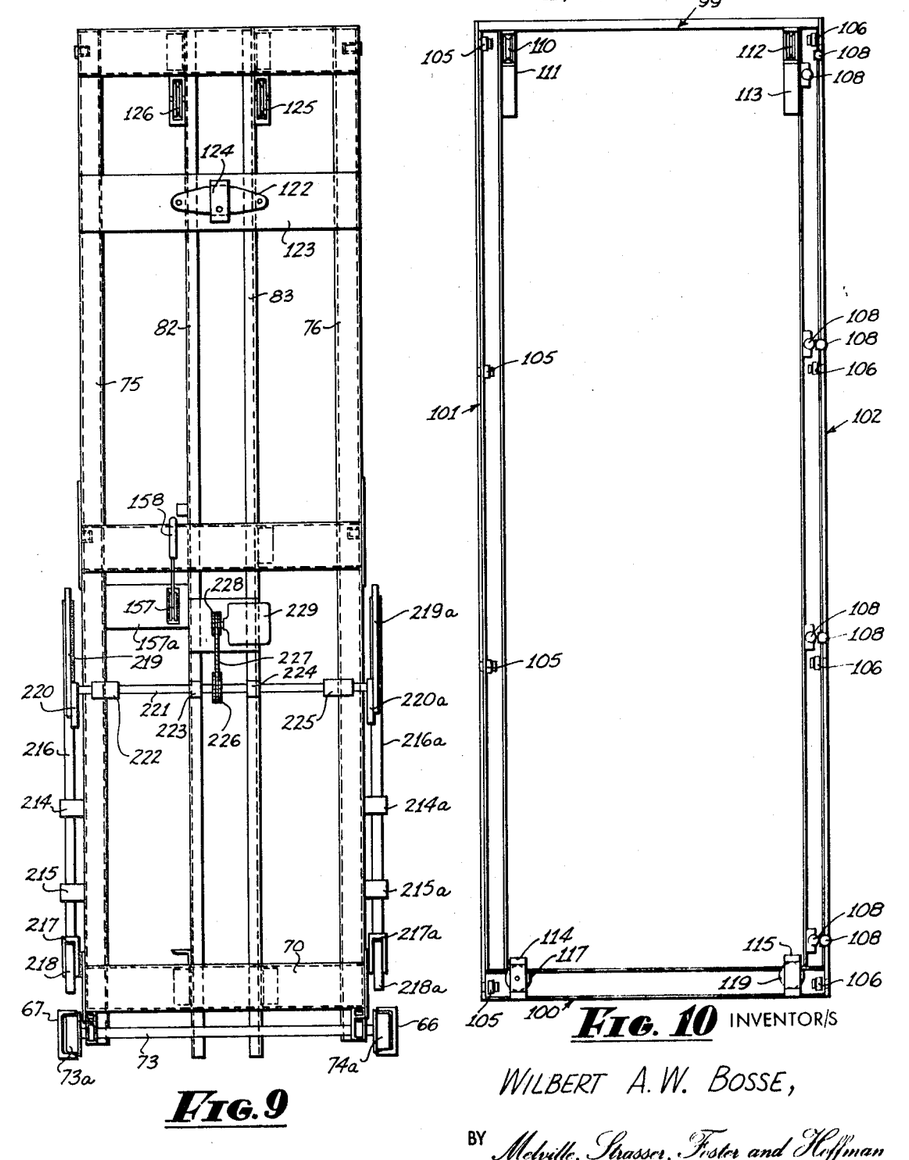
FIG. 9 is an elevational view of the other end of the stacker.
FIG. 10 is an elevational view of the intermediate elevator frame.

The stacker frame includes a plurality of uprights 75 through 80. As illustrated in FIGS. 7 through 9, these uprights are joined together by a plurality of horizontal braces. While these last-mentioned braces are illustrated in the Figures, for purposes of clarity index numerals have not been ascribed to these various braces, with the exception of those to which other structural elements are attached (as will be described hereinafter).

As viewed in FIG. 6, the large opening in the stacker frame generally indicated at 81 (and defined by side frame members 68–69, transverse frame members 70–71 and vertical frame members 75–78) comprises the vertical shaft for the intermediate elevator frame and elevator. The stacker is provided with a first facing pair of vertical channels 82 and 83 and a second pair of facing vertical channels 84 and 85. The channels 82—83 and 84—85 comprise guide means for the intermediate elevator frame-elevator assembly (to be described hereinafter).

That portion of the bottom of the stacker frame defined by side frame members 68–69 and transverse frame members 71–72 may be provided, in part at least, with a grating 86. This grating comprises a horizontal platform or floor on which the operator of the materials handling device may stand.

As is true of the carriage, the stacker assembly may be powered by any suitable form of prime mover. For purposes of an exemplary showing, FIGS. 7 and 8 illustrate an electric motor 87 having a shaft 88 entering a gear box 89. As shown in FIG. 7, the gear box 89 has a shaft bearing a sprocket 90. A similar sprocket 91 is splined or otherwise affixed to the axle 74 and sprockets 90 and 91 are joined by a belt-chain 92. Thus, rotation of the motor shaft 88 is communicated through gear box 89, sprockets 90 and 91 and belt-chain 92 to the axle 74. In this way, wheels 74a and 74b are powered. The motor 87 is reversible, so that the stacker may move back and forth in an east-west direction along any of the stacker rails and the rails 66 and 67 on the carriage.

As indicated above, the carriage may be connected to a source of electrical energy by a cable (not shown) controlled by the carriage cable drum 62. The electrical current thus made available at the carriage may similarly be made available at the stacker by means of a second cable appropriately connected at the other end to the stacker. Such a second cable is indicated in FIGS. 7 and 8 by the index numeral 93.

Since the stacker assembly is adapted to leave the carriage and travel in either an eastward or westward direction along stacker rails in the access aisles, means must be provided for paying out and taking up the stacker cable 93. For this purpose, a drum 94 is illustrated in FIGS. 7 and 8. The drum 94 is adapted to serve substantially the same purpose as the cable drum 62 on the carriage. The cable 93, as it leaves the drum 94, is directed by roller guide means 95 and 96 to a pair of rollers 97 and 98 at the bottom of the stacker frame. The cable guide means 95, 96, 97 and 98 are affixed to the stacker frame in any suitable manner. When the stacker assembly is moving on the east side of the transfer aisle, the cable 93 will be guided by the roller 97. Similarly, when the stacker assembly is traveling on the west side of the transfer aisle, the cable 93 will be guided by the roller 98.

Since both the carriage and the stacker are electrically interconnected and connected to a source of electrical current, in the preferred embodiment the operator of the materials handling means will ride the stacker assembly, being supported by the grating 86, and will be provided with control means for the carriage motor, the stacker motor and the additional prime movers to be described hereinafter. Such control means and the electrical connections of the various motors are conventional and do not constitute a part of the present invention.

It will be understood by one skilled in the art that the stacker, as in the case of the carriage, may be powered by any suitable prime-mover means.

Figures 11, 13, 14, 15, 16, 17, 18:
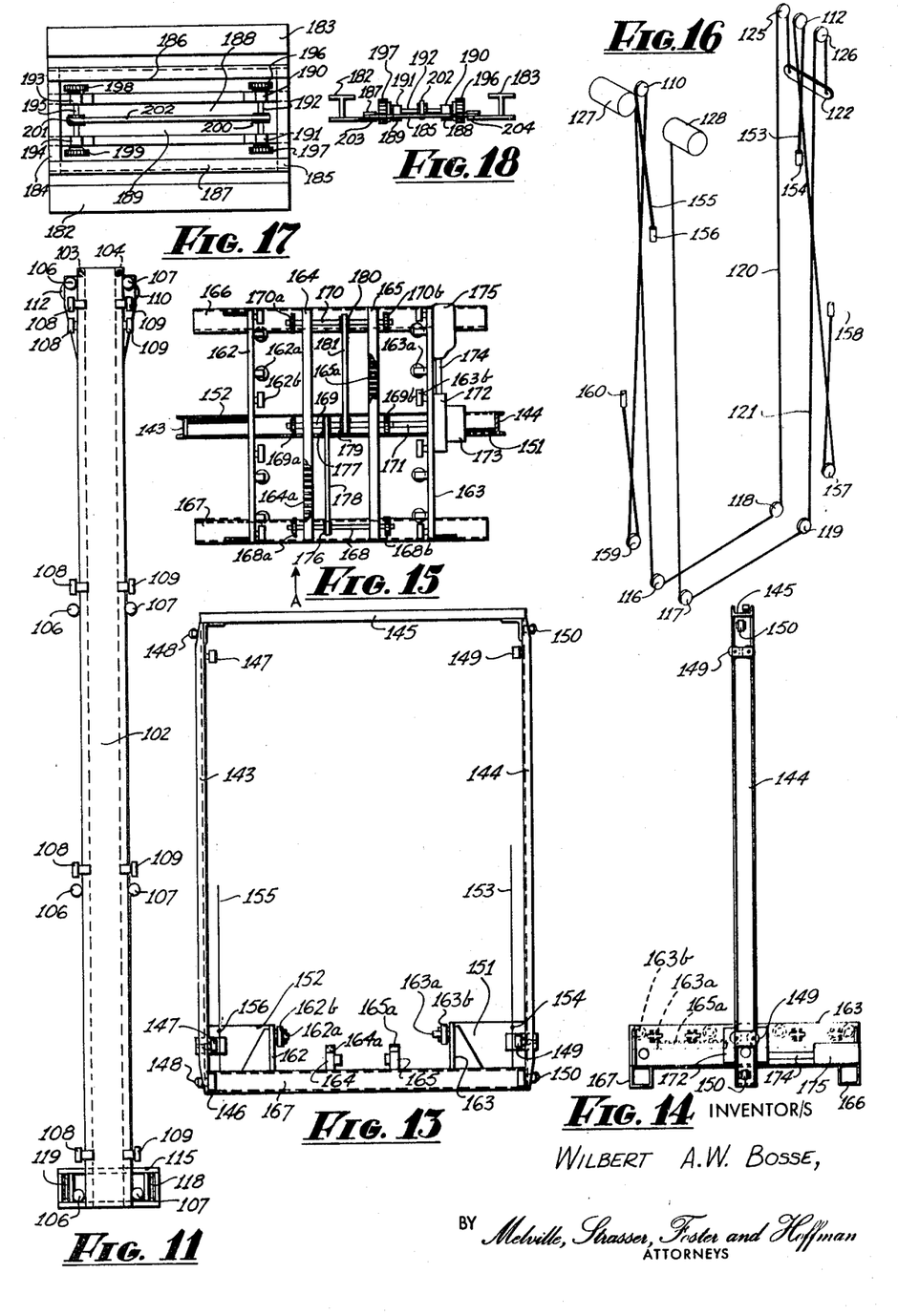
FIG. 11 is an end elevation of the intermediate elevator frame.
FIG. 13 is an elevational view of the elevator.
FIG. 14 is a side elevational view of the elevator.
FIG. 15 is a plan view of the elevator.
FIG. 16 is a diagrammatic illustration of the cables controlling the intermediate frame and the elevator.
FIG. 17 is a plan view of the intermediate dolly frame.
FIG. 18 is an end elevational view of the intermediate dolly frame.
Figure 12:
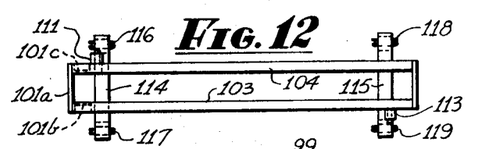
FIG. 12 is a plan view of the intermediate elevator frame.

FIGS. 10, 11 and 12 illustrate the intermediate elevator frame which is adapted to move upwardly and downwardly in the vertical channel members 82—83 and 84—85 on the stacker frame.

The intermediate elevator frame comprises horizontal frame members generally indicated at 99 and 100 and vertical frame members generally indicated at 101 and 102. The horizontal bottom frame member 100 may be of any suitable nature including a channel member or an I-beam. As is most clearly shown in FIGS. 10 and 12, the vertical frame 101 comprises a vertical plate 101a and a pair of spaced channel members 101b and 101c. It will be understood by one skilled in the art that the vertical frame member 102 will be similarly constructed. The upper horizontal frame member 99 may comprise a pair of spaced beams 103 and 104 (See FIG. 12). The vertical frame member 101 is adapted to ride within the channel members 82—83 (See FIG. 6). Accordingly, the intermediate elevator frame member 101 may be provided with a plurality of rollers on both sides adapted to contact the base portions of the channels 82–83. In FIG. 10 the rollers on one side of the intermediate elevator frame member 101 are shown at 105.

The vertical intermediate elevator frame member 102 may similarly be provided with rollers on either side thereof adapted to engage the base portions of the channels 84–85. These rollers are shown in FIGS. 10 and 11 at 106 and 107. In addition, each side of the intermediate elevator frame member 102 may be provided with spaced pairs of rollers adapted to engage the flanges of the channels 84 and 85. These rollers keep the intermediate elevator frame properly centered within the channels 82–83 and 84—85. Pairs of such rollers are indicated at 108 and 109 in FIGS. 10 and 11. The intermediate elevator frame member 101 may be equipped with similar pairs of rollers, when desired.

At the upper end of the intermediate elevator frame a pulley 110 and a surrounding housing 111 are affixed to frame members 101c and 104. Similarly, a second pulley 112 and surrounding housing 113 are affixed to frame members 102 and 103. The purpose of these pulleys will be described hereinafter. At the bottom of the intermediate elevator frame the horizontal beam 100 carries a pair of housings 114 and 115. The housing 114 supports a pair of pulleys 116 and 117, while the housing 115 supports a second pair of pulleys 118 and 119.

The vertical movement of the intermediate elevator frame within the channels 82–83 and 84—85 is controlled by a pair of main elevator cables, next to be described. Reference is made to FIGS. 7–9, 10—12 and 16.

The main elevator cables 120 and 121 are most clearly seen in the diagrammatic illustration of FIG. 16. One end of each of the cables 120 and 121 is tied to a cable equalizer bar 122. The cable equalizer bar, located on the stacker frame is illustrated in FIG. 9. A horizontal frame member 123 is affixed to vertical members 75 and 76 of the stacker frame. The equalizer bar 122 is pivotally mounted in a housing 124 affixed to the horizontal brace 123.

From the equalizer bar 122 the cables 120 and 121 pass over pulleys 125 and 126 respectively. The pulleys 125 and 126 are mounted on the stacker frame and are illustrated in FIG. 9.

From the pulley 125, the cable 120 passes about pulleys 118 and 116 on the intermediate elevator frame. In similar manner, cable 121 passes from pulley 126 about pulleys 119 and 117 on the intermediate elevator frame.

From pulley 116, cable 120 passes upwardly to hoist drum 127. Similarly, cable 121 passes from pulley 117 upwardly to hoist drum 128. The hoist drums 127 and 128 are mounted to the upper portion of the stacker frame and are illustrated in FIGS. 7 and 8.

Referring to FIGS. 7 and 8, hoist drum 127 is nonrotatively affixed to a shaft 130. The shaft is rotatively mounted in suitable bearing means 131 and 132. The shaft 130 has a sprocket 133 nonrotatively affixed thereto. The sprocket 133 is connected by a belt-chain 134 to a sprocket 135 mounted on the shaft of an electric motor and gear reducer 138.

Cable drum 128 is also nonrotatively affixed to a shaft 137 mounted in suitable bearing means 138 and 139. The shaft 137 has nonrotatively affixed thereto a sprocket 140 connected by a belt-chain to a sprocket 141 mounted on the shaft of an electric motor and gear reducer 142. The shafts 130 and 137 may be coupled as at 130a.

From the above, it will be evident to one skilled in the art that energization of electric motors 136 and 142 will by means of cables 120 and 121 cause the intermediate elevator frame to move vertically within the channels 82–83 and 84—85. The intermediate elevator frame will move upwardly when cables 120 and 121 are wound onto drums 127 and 128, respectively. When the direction of rotation of motors 136 and 142 is reversed, the drums 127 and 128 will be caused to pay out cables 120 and 121, respectively, causing the intermediate elevator frame to move downwardly.

Again the electrical connections for motors 136 and 142, together with control means therefor, are conventional and do not constitute a part of the present invention.

The elevator itself, intended to move vertically within the intermediate elevator frame, is illustrated in FIGS. 13 through 15. The elevator comprises a frame having vertical channel members 143 and 144 joined at the top by a channel member 145 and at the bottom by a beam 146.

The vertical channel member 143 is adapted to ride between the channels 101b and 101c of the intermediate elevator frame member 101. The vertical channel member 143 of the elevator may be equipped with pairs of rollers 147 adapted to contact the channels 101b and 101c. Similarly, the elevator channel member 143 may have additional rollers 148 adapted to contact the plate portion 101a of the intermediate elevator frame member 101. In similar manner, the elevator channel member 144 may have pairs of rollers 149 similar to the rollers 147 and additional rollers 150 similar to the rollers 148 to cooperate with the structural members making up the vertical frame member 102 of the intermediate elevator frame.

A vertically oriented plate 151 is affixed to the top surface of the beam 146 and the inside surface of the vertical channel 144. A similar vertically oriented plate 152 is affixed to the top surface of the beam 146 and the inside surface of the vertical channel 143. A first intermediate elevator chain is indicated at 153 with its end affixed to the plate 151 at 154. A second intermediate elevator chain is shown at 155 with its end affixed to the plate 152 at the point 156.

FIG. 16 diagrammatically illustrates the first intermediate elevator chain 153 and its anchoring point 154 (see FIG. 9). From the anchoring point 154, the intermediate elevator chain passes over the pulley 112 (see also FIG. 10) at the top of the intermediate elevator frame. From the pulley 112, the chain 153 passes about a pulley means 157 affixed to a conventional slack chain takeup means 157a slidably mounted on the stacker frame (see FIG. 9). From the slack chain takeup means the cable passes to a second anchoring point 158 on the stacker frame.

In similar manner, FIG. 16 illustrates the second intermediate elevator chain 155 extending from its anchor point 156 on the elevator itself to the pulley 110 (see also FIG. 10) at the top of the intermediate elevator frame. From the pulley 110, the chain 155 passes about a pulley 159 on a conventional slack chain takeup means 159a slidably mounted on the stacker frame to a second anchoring point 160, again on the stacker frame (see FIG. 8).

As indicated above, in order for the elevator to bring the dolly means it carries into alignment with the various racks or shelves of the storage means, it is necessary for the elevator to be capable of moving upwardly to various positions above the bottom portion of the stacker frame and to move downwardly to various positions below the bottom portion of the stacker frame. At the same time, it is important that when the stacker frame is running on the stacker rails the pallet and its load be held in the position indicated in dotted lines at 161 in FIG. 7, without any elevator guide means extending below the base portion of the stacker frame so that the aisles are free to work in. As a consequence, the intermediate elevator frame is provided to serve as extensible guide means for the elevator in its downward and upward movements. As indicated above, the intermediate elevator frame is moved upwardly and downwardly through the agency of main elevator cables 120, 121, cable drums 127, 128 and motors 136, 142. By virtue of the fact that the first and second intermediate elevator cables are each anchored at one end to the elevator itself and at the other end to the stacker frame, and pass over pulleys 110 and 112 on the intermediate elevator frame, movement of the intermediate elevator frame will cause appropriate relative movement of the elevator itself.

In the exemplary embodiment the intermediate elevator frame is substantially equal in height to two of the storage racks 40–43 shown in FIG. 2. The elevator is approximately equal in height to one such storage rack. The normal position for the elevator is at the bottom of the intermediate frame when the materials handling device is moving in the transfer aisle or the stacker is moving in one of the access aisles. When the lowermost storage rack is to be loaded or unloaded the intermediate elevator frame will move (by about half its length) below the stacker frame and the elevator will remain at the bottom of the intermediate frame.

Access may be had to the storage rack 42 when the elevator and the intermediate elevator frame are in their normal position. Access to upper racks 40 and 41 requires upward movement of both the elevator and the intermediate frame. To reach the topmost frame 40, the intermediate elevator frame will rise from its normal position by about half its length. Simultaneously, the elevator will move upwardly by three times its length (at twice the speed of the movement of the intermediate elevator frame). Upward movement of the elevator is achieved through elevator chain 153 and 155. When the intermediate frame moves upwardly the chain slack takeup means 157a and 159a will have reached their limits.

As indicated above, the elevator supports a load carrying dolly. The dolly, in turn, is extensible into the storage means on either side of the aisles therebetween. In this way, a loaded pallet on the dolly may be shifted from the elevator to a rack in the storage means and deposited therein. The dolly and means for its movement will next be described, referring to FIGS. 13-15 and 17-21.

FIG. 15 is a plan view of the base portion of the elevator. The beam 146 supports a first pair of transverse members 162 and 163, and a second pair of transverse members 164 and 165. To the ends of these members there is affixed beams 166 and 167, parallel to the beam 146. Additional bracing members (not shown) may be provided as desired.

As in most clearly seen in FIGS. 13 through 15, the members 162 and 163 comprise platelike elements and carry on their facing surfaces a plurality of horizontally oriented rollers 162a and 163a, respectively, and a plurality of vertically oriented rollers 162b-163b comprise guide means for the dolly assembly, as will be described hereinafter.

The transverse members 164 and 165 support and are equipped with suitable bearing means for shafts 168, 169 and 170. The shaft 168 has at its ends gears 168a and 168b. Similarly, shaft 169 carries gears 169a and 169b, while shaft 170 carries gears 170a and 170b. The shaft 169 is provided with a coupling 171. The coupling 171 is connected through a gear box 172 and a slip clutch 173 to the shaft 174 of an electric motor 175. The electric motor 175 is attached to the base framework of the elevator adjacent the transverse member 163. Actuation of the electric motor 175 will cause rotation of the shaft 169.

The shaft 168 carries a sprocket 176. The shaft 169 carries a sprocket 177. The last-mentioned sprockets are connected by a belt chain 178 so that rotation of the shaft 169 will cause rotation of the shaft 168.

The shaft 169 carries a second sprocket 179. The shaft 170 carries a sprocket 180. The sprockets 179 and 180 are joined by a belt chain 181 so that rotation of the shaft 169 will cause rotation of the shaft 170. From the above, it will be evident that when the electric motor 175 is actuated, the shafts 168, 169 and 170 will all be caused to rotate in the same direction as the motor shaft.

It will further be noted that the transverse members 164 and 165 also carry on their upper surfaces longitudinally extending rack means 164a and 165a, respectively. The purpose of these rack means will be set forth hereinafter.

An intermediate dolly frame is illustrated in FIGS. 17 and 18. The intermediate dolly frame comprises a pair of parallel structural members 182 and 183 of I-beam cross-sectional configuration. The ends of the members 182 and 183 are joined by straplike structural members 184 and 185. These structural members, in turn, support additional straplike structural members 186, 187 188 and 189, all parallel to the structural members 182 and 183. The members 188 and 189 carry bearing means 190 and 191 for a shaft 192. They also carry bearing means 193 and 194 for a shaft 195. The shaft 192 has at its ends gears 196 and 197. The shaft 195 has at its ends gears 198 and 199.

As is most clearly shown in FIG. 17, the shaft 192 carries a sprocket 200. The shaft 195 carries a similar sprocket 201. These sprockets are joined by a belt chain 202 so that rotation of one of the shafts 192 and 195 will impart similar rotation to the other.

The intermediate dolly frame supports a pair of longitudinally extending racks 203 and 204 (FIG. 18) with the rack teeth extending downwardly. The rack 203 is adapted to be engaged by the gears 168a, 169a and 170a (FIG. 15) on the elevator base. The rack 204 is similarly adapted to be engaged by gears 168b, 169b and 170b (FIG. 15) on the elevator base.

The interaction of the last-mentioned set of gears on the elevator base and the intermediate dolly frame racks 203 and 204 will cause shifting of the intermediate dolly frame when the motor 175 is actuated. Shifting of the intermediate dolly frame with respect to the elevator base will, in turn, cause rotation of shafts 192, 195 and gears 196-197, 198-199 on the intermediate dolly frame by virtue of interaction of the intermediate dolly frame gears and the racks 164a and 165a on the elevator base.

Figure 19:
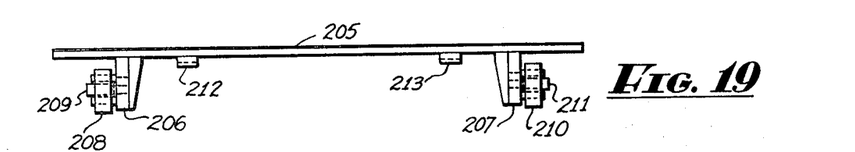
FIG. 19 is an end elevational view of the dolly.
Figure 20:
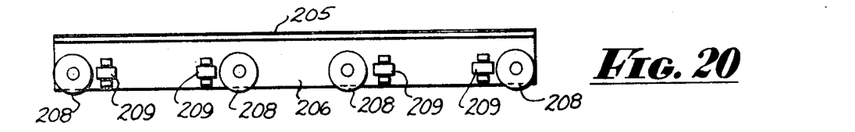
FIG. 20 is a side elevational view of the dolly.

The dolly itself is illustrated in FIGS. 19 and 20. The dolly comprises a horizontally oriented, rectangular, load sustaining member 205 having longitudinally extending, downwardly depending beams 206 and 207 affixed to its underside. As is most clearly shown in FIG. 20, the beam 206 has a plurality of freely rotatable, vertically oriented rollers 208 and a plurality of freely rotatable, horizontally oriented rollers 209. The beam 207 is provided with similar set of freely rotatable, vertically oriented rollers, one of which is shown at 210. It also has a similar set of freely rotatable, horizontally oriented rollers, one of which is shown at 211. In addition, the load supporting member 205 has a pair of parallel racks 212 and 213 affixed to its underside. The rack 212 is adapted to be engaged by the intermediate dolly frame gears 197 and 199. The rack 213 is adapted to be engaged by the intermediate dolly frame gears 196 and 198.

Figures 21, 22, 23:
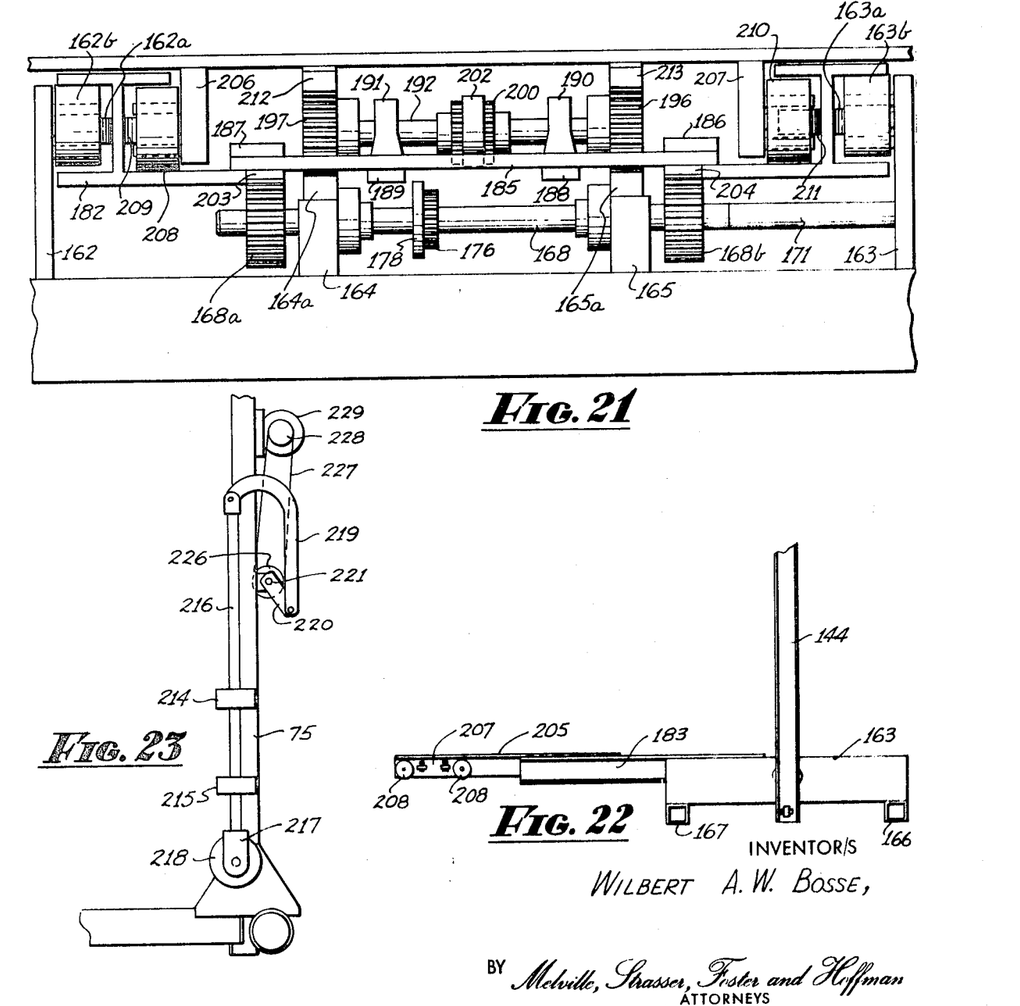
FIG. 21 is a fragmentary elevational view illustrating the dolly and intermediate dolly frame mounted on the elevator.
FIG. 22 is a side elevational view of the dolly and intermediate frame in fully extended position.
FIG. 23 is a fragmentary side elevation of one of the stacker locking wheel assemblies.

FIG. 21 is a fragmentary view of the base portion of the elevator including the complete dolly assembly. Like parts have been given like index numerals.

It will be evident that the intermediate dolly frame is supported on the elevator base by contact between rollers 162b and 163b of elevator base members 162 and 163 and the I-beam portions 182 and 183 of the intermediate elevator frame and contact between rollers 208 and 210 on the dolly members 206 and 207 and intermediate dolly frame portions 182 and 183.

FIG. 21 further shows the interaction between intermediate dolly frame gears 197, 199 and 196, 198 and racks 164a and 165a on the elevator base as well as the interaction between intermediate dolly frame racks 203 and 204 and the gears 168a–169a–170a and 168b–169b–170b on the elevator base. Gears 168a and 168b of the elevator base are also shown. Thus, when motor 175 (FIGS. 14 and 15) is actuated, the shaft 169 and its gears 169a and 169b will be caused to rotate (see FIG. 15). The remaining shafts 168 and 170 and their respective gears 168a–168b and 170a–170b will also be caused to turn through the agency of belt chains 178 and 181 and their respective sprockets 176, 177, 179 and 180 (FIG. 15). In this way, the intermediate dolly frame may be moved forwardly or rearwardly, (upwardly or downwardly of the plane of FIG. 21).

The intermediate dolly frame is maintained in its proper centered relationship with respect to the elevator base through contact of the I-beam structural members 182 and 183 by the horizontally oriented rollers 162 and 163a affixed to the transverse members 162 and 163 of the elevator base. The proper horizontal orientation of the intermediate dolly frame is maintained by the interaction of the I-beam structural members 182 and 183 and the vertically oriented rollers 162b and 163b affixed to the transversed members 162 and 163. When in its maximum extended positions, the intermediate dolly frame will overhang beam 166 or beam 167 of the elevator base by slightly more than half of its length, as seen in FIG. 22.

Movement of the intermediate dolly frame will, in turn, cause rotation of intermediate dolly shaft 192 and its gears 196 and 197. This is true by virtue of the interaction of these gears and the racks 164a and 165a mounted on the top surfaces of transverse members 164 and 165, respectively. It will be understood, from FIG. 17, that the gears 198 and 199 on the intermediate dolly frame shaft 195 will also engage the racks 164a and 165a. When the intermediate dolly frame is in its extended positions, the gears 196 and 197 or the gears 198 and 199 will have passed beyond the racks 164a and 165a. However, one set of these gears will always be in contact with the racks, and that set of gears not in contact with the racks will continue to turn by virtue of the interconnection of shafts 192 and 195 by the belt-chain 202 and the sprockets 200 and 201.

The dolly itself is supported on the intermediate dolly frame by virtue of the interaction of dolly rollers 208 and 210 and the intermediate frame structural members 182 and 183. In addition, dolly racks 212 and 213 will be engaged by the intermediate dolly frame gears 197, 199 and 196, 198, respectively. The interaction of the dolly racks and the intermediate dolly frame gears will cause relative motion of the dolly with respect to the intermediate dolly frame when the intermediate dolly frame gears are caused to rotate.

By virtue of the interaction of the dolly racks and the intermediate dolly frame gears, the dolly can move between extended position wherein at least half of its length can extend beyond one end or the other of the intermediate dolly frame (see FIG. 22). When in these positions, the dolly will extend completely beyond one side or the other of the elevator base. In its extended positions, the dolly will be located within the racks of the storage means, on one side or the other of an access aisle.

As the dolly travels toward one extended position or the other, the dolly racks 212 and 213 will move out of contact either with intermediate dolly frame gears 96, 97 or 98, 99. Nevertheless, the interconnection of the intermediate dolly frame shafts by the belt chain 202 will insure that at least one set of the dolly frame gears will continue to shift the dolly.

The dolly is maintained in its proper aligned position with respect to the intermediate dolly frame by virtue of the contact of the intermediate dolly frame members 182 and 183 by the horizontally oriented dolly rollers 209 and 210, respectively. Similarly, the dolly will be maintained in its horizontal position by the interaction of the intermediate dolly frame members 182 and 183 and the vertically oriented dolly rollers 208 and 210, respectively. The maximum extended positions of the dolly will be determined by mechanical stop means (not shown) and electrical stop means (not shown) operatively connected to the motor 175. Such mechanical and electrical stop means (not shown) are operatively connected to the motor 175. Such mechanical and electrical stop means are well known in the art.

When the stacker assembly is in its normal position on the carriage, it is preferable to have the stacker locked in place so that it cannot move with respect to the carriage or roll off the carriage, particularly when the carriage itself is moving along the transfer aisle. Thus, some form of locking means should be provided to maintain the stacker firmly in place on the carriage.

Reference is made to FIGS. 9 and 23 wherein a locking means for the stacker is illustrated. In FIG. 23, the vertical stacker frame element 75 is shown as having a pair of guide means 214 and 215 with a vertical shaft 216 slidably mounted therein. The bottom end of the shaft 216 has a bifurcated member 217 mounting a wheel 218.

One end of a link 219 is pivotally affixed to the top of the shaft 216. The other end of the link 219 is pivotally affixed to a lever 220. The lever 220 is nonrotatively mounted to a shaft 221. From FIG. 23, it will be readily seen that rotation of the shaft 221, through the interaction of the lever 220 and link 219 will cause the shaft 216 and wheel 218 to move upwardly and downwardly.

As shown in FIG. 19, a second assembly, substantially identical to that shown in FIG. 23, is located adjacent the vertical stacker frame member 76. Like parts have been given like index numerals followed by "a." It will be noted that the shaft 221 extends across the stacker frame and both levers 220 and 220a are nonrotatively affixed to it. The shaft 221 is rotatively mounted in suitable bearing means 222-225.

A sprocket 226 is nonrotatably affixed to the shaft 221. The sprocket 226 is connected by belt chain 227 to a sprocket 228 on the shaft of an electric motor 229.

From the above it will be evident that rotation of the shaft of the motor 229 in one direction will cause both shafts 216 and 216a to move downwardly, while rotation of the motor shaft in the opposite direction will cause shafts 216 and 216a to move upwardly. As is most clearly shown in FIGS. 3 and 5, the carriage rail 66 is provided with a pair of spaced vertical members 230 and 231 defining a pocket. This pocket is adapted to receive the stacker locking wheel 218. Carriage rail 66 is provided with similar vertical members 232 and 233 defining a pocket for stacker locking wheel 218a. Thus, when the wheels 218 and 218a are in their appropriate pockets on the carriage rails 67 and 66, the stacker will be firmly locked in place on the carriage.

It will be understood by one skilled in the art that additional pocket-forming members may be appropriately located on the elevated tacks in the access aisles so the stacker assembly may be indexed or appropriately aligned and locked in place with respect to each vertical assembly of superposed storage racks and the dolly will be properly aligned with the storage rack support rails so that load carrying pallets may be placed on or removed from them. The pockets on the rails of the access aisles are generally indicated in FIGS. 1 and 2 at 218b, and may constitute extensions of the pallet-supporting rails 44 at the second storage level.

Figure 24:
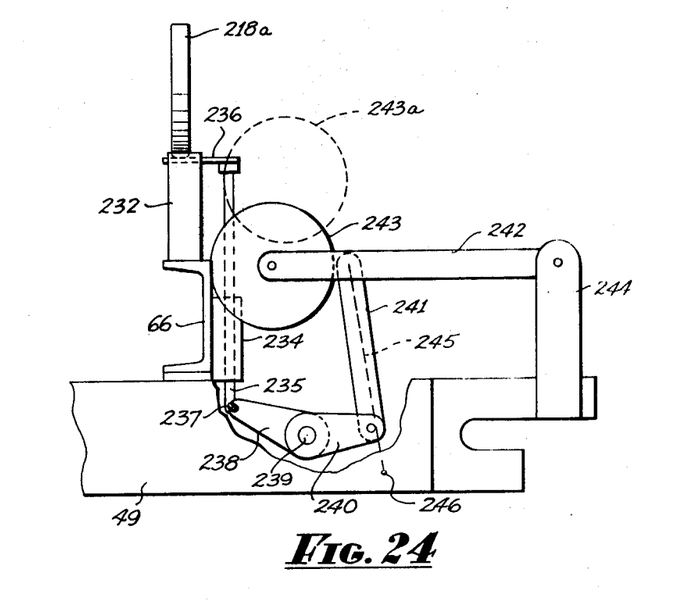
FIG. 24 is a fragmentary side elevation of one of the carriage locking wheel assemblies.
Figure 25:
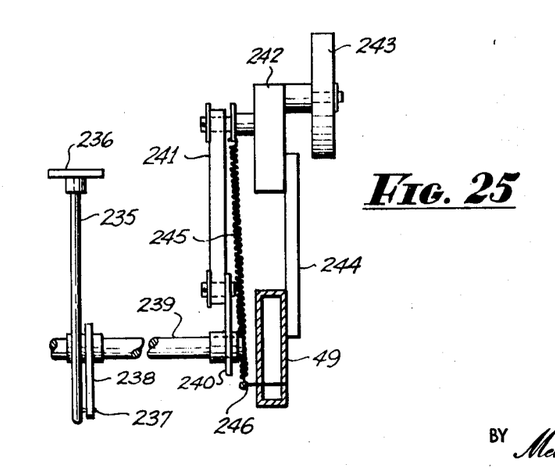
FIG. 25 is a fragmentary end elevation of the carriage locking wheel assembly of FIG. 24.

When the carriage is properly aligned with a pair of elevated rails in one of the access aisles, so that the stacker assembly may leave the carriage and enter the access aisle, it is preferable that means be provided to properly index or locate the carriage in its aligned position and to lock it there. Reference is made to FIGS. 24 and 25 wherein a locking wheel assembly for the carriage is shown.

In FIG. 24, the locking wheel 218a of the stacker assembly (see FIG. 9) is illustrated in its uppermost position. The figure also shows at 232 one of the elements forming the pocket adapted to receive the stacker wheel 218a when in its lowermost or locking position (see FIG. 3). The element 232 is affixed to rail 66, which is one of the stacker assembly rails on the carriage means. The rail 66 is affixed to the side frame element 49 of the carriage (see FIG. 3). Behind the rail 66 there is a guide means 234 with a vertical hole therein. A shaft 235 is slidably mounted in the guide means 234. The top of the shaft 235 has a contact plate 236, a portion of which extends laterally into the pocket formed by elements 232 and 233. Thus, when stacker locking wheel 218a moves downwardly into its locking position within the pocket, it will contact the plate 236 and cause the shaft 235 to move downwardly.

The bottom end of the shaft 235 is provided with a laterally extending pin 237. This pin is received in a notch in the free end of a lever 238. The lever 238 is nonrotatively affixed to a shaft 239. A second lever 240 is nonrotatively affixed to the shaft 239. The free end of the lever 240 is pivotally affixed to a connecting link 241. The connecting link 241 is, in turn, pivotally connected to a locking wheel arm 242. One end of the locking wheel arm 242 bears a carriage locking wheel 243 while the other end of the arm 242 is pivotally affixed to an upright 244 mounted on the carriage side frame 49.

FIG. 24 illustrates the carriage locking wheel 243 in its lowermost or locking position. FIG. 25 illustrates the carriage locking wheel in its uppermost or unlocking position. As will be noted from FIG. 25, the locking wheel 243 extends beyond the edge of the carriage side frame element 49. In the position shown in FIG. 24, the locking wheel 243 will be located between pocket forming means (not shown) on the carriage rail in the transfer aisle. It will further be noted that when the carriage locking wheel 243 is in its locking position, the stacker locking wheels (one of which is shown at 218a) must be in their unlocked position so that the stacker is free to leave the carriage.

From FIG. 24, it will be evident that if the stacker is moved onto its rails on the carriage and if the stacker locking wheels are lowered into locking position, the wheel 218a will cause the shaft 235 to move downwardly. Through the agency of lever 238, downward motion of the shaft 235 will cause rotation of shaft 239. This, in turn, will cause the lever 240 to rotate in a counterclockwise position. Such rotation of the lever 240 will, through the agency of link 241, cause locking wheel arm 242 to move upwardly, positioning the carriage locking wheel in its upward or unlocked position indicated in dotted lines at 243a. Now the stacker assembly is firmly locked on the carriage and the carriage is free to move back and forth along the carriage rails in the transfer aisle. It will be understood by one skilled in the art that a similar assembly to that shown in FIG. 24 can be provided on the other side of the carriage frame. The locking wheel pockets on the transfer aisles rails 30 and 31 are generally indicated at 30a and 31a, respectively, in FIGS. 1 and 2. For example, the last-mentioned pockets may be formed by the access aisle rails and adjacent plates, as shown.

It will be noted that the action of the stacker locking wheels and carriage locking wheels are simultaneous and interconnected. The carriage locking wheels are, in fact, actuated by the stacker locking wheels, which in turn are operated by the electric motor 229.

When the stacker locking assembly wheels are in their uppermost or unlocked position, the carriage locking wheel will be returned to its locking position (as shown in FIG. 24) by means of a spring 245. In FIG. 24, the spring 245 is diagrammatically illustrated by a dotted line. In FIG. 25 the spring is shown in full. The upper end of the spring 245 is affixed to the pivotal connection between the locking wheel arm 242 and the link member 241. The lower end of the spring is attached by any suitable means to the carriage side frame member 49, as at 246.

From the above description, it will be seen that the carriage of the materials handling device of the present invention can deliver the stacker assembly to any one of the desired storage or access aisles 6, 7, 14 and 15 or the delivery corridor 28. When the desired aisle has been reached, the stacker assembly can leave the carriage and move along the stacker rails to any desired storage unit. The intermediate elevator frame and elevator assembly can locate the dolly at any desired vertical level. Finally, the dolly may be extended into a desired storage unit on either side of the aisle by virtue of the dolly, intermediate dolly frame and elevator base assembly.

Thus all areas of the storage facility are accessible to the materials handling device of the present invention. In addition, all of the aisles and corridors are unobstructed when the materials handling device is at rest or traveling, a portion of the device extending into an aisle only when materials are actually being delivered or retrieved from a lower level storage rack.

Modifications may be made in the invention without departing from the spirit of it.

The embodiments of the invention in which an exclusive property or privilege is claimed are defined as follows:

1. In a storage facility of the type having a plurality of superposed storage means arranged in parallel rows with access aisles between said parallel rows and a transfer aisle extending transversely of said access aisles, means for depositing materials in and removing said materials from said storage means comprising a pair of elevated rails extending longitudinally of said transfer aisle in a horizontal plane at a height from the floor of said transfer aisle sufficient to provide adequate clearance for workmen, lift trucks and the like in said transfer aisle, a pair of rails extending longitudinally of each of said access aisles and elevated from the floor of its respective access aisle in a horizontal plane above said plane of said transfer aisle rails, a carriage comprising a wheeled support means, a pair of spaced rails on said carriage, means for moving said carriage on said transfer aisle rails and to align said pair of carriage rails with any one of said pairs of access aisle rails on either side of said transfer aisle, a stacker assembly comprising a wheeled support, dolly means supported by said stacker means for moving said stacker along any one of said pairs of access aisle rails on either side of said transfer aisle and on to and off of said rails on said carriage, means on said stacker assembly for raising and lowering said dolly above and below said rails in said access aisles to the level of any one of said superposed storage means and to a lowermost position wherein said dolly means may be loaded and unloaded directly, means for extending said dolly transversely of said stacker assembly into any one of said storage means, stacker assembly locking means to maintain said stacker assembly in position on said rails on said carriage or in positions along said rails in said access aisles in alignment with said superposed storage means and carriage locking means to maintain said carriage in positions along said rails in said transfer aisle with said rails on said carriage in alignment with any of said pairs of rails in said access aisles, said stacker assembly locking means comprising at least on locking wheel mounted on said stacker assembly, a locking wheel receiving pocket mounted on at least one of said carriage rails and a plurality of locking wheel receiving pockets mounted on at least one rail of each pair of rails in said access aisles, said last-mentioned pockets being so located on said access aisle rails as to determine said positions along said access aisle rails in which said stacker assembly is desired to be locked, said locking wheel on said stacker assembly being movable between an extended position wherein it will be received within any desired one of said pockets and a retracted position clear of said pocket, said locking wheel when extended into one of said carriage rail or transfer aisle rail pockets locking said stacker assembly in the position determined by said last-mentioned pocket, said carriage locking means comprising at least one locking wheel mounted on said carriage and a plurality of locking wheel receiving pockets mounted on at least one of said rails of said pair of rails in said transfer aisle at positions corresponding to positions wherein said carriage rails are aligned with each of said pair of rails in said access aisles, said carriage locking wheel being movable between an extended position wherein it is received within any one of said pockets on said transfer aisle rail and a retracted position clear of said last-mentioned pockets, linkage means in association with said carriage locking wheel and contactable by said stacker assembly locking wheel, whereby said carriage locking wheel is in said retracted position when said stacker assembly locking wheel is received within said pocket on said carriage rail and said carriage locking wheel is in its extended position when said stacker assembly locking wheel is clear of said pocket on said carriage rail.

2. The structure claimed in claim 1 wherein at least two of said parallel rows of superposed storage means and the access aisle therebetween are enclosed in a separate chamber, said chamber having a closable opening therein through which said stacker assembly may pass.

3. The structure claimed in claim 1 wherein each of said storage means comprises a cubicle having a pair of horizontal spaced pallet supports at the bottom thereof, said supports being spaced from each other by a distance sufficient to permit said dolly to enter therebetween.

4. The structure claimed in claim 1 wherein said means for moving said carriage on said transfer aisle rails comprise an electric motor and drive means for said carriage wheels.

5. The structure claimed in claim 1 wherein said means for moving said stacker assembly comprise an electric motor and drive means for said stacker assembly wheels.

6. The structure claimed in claim 1 wherein said stacker assembly comprises a stacker frame, an intermediate elevator frame mounted for vertical movement on said stacker frame, an elevator mounted for vertical movement on said intermediate elevator frame, said dolly means being supported on said elevator.

7. The structure claimed in claim 6 wherein said elevator has a horizontal base frame, an intermediate dolly frame mounted on said base frame, means for moving said intermediate dolly frame relative to said base frame and transversely thereof in a direction transverse said access aisles, said dolly being mounted on said intermediate dolly frame, means for moving said dolly relative to said intermediate dolly frame and said base frame in a direction transverse said access aisles, said dolly being movable from a normal position centered on said base frame to extreme opposite positions wherein said dolly lies beyond said base frame and is connected thereto by said intermediate dolly frame.

8. In a storage facility of the type having a plurality of superposed storage means arranged in parallel rows with access aisles between said parallel rows and a transfer aisle extending transversely of said access aisles, means for depositing materials in and removing said materials from said storage means comprising a pair of elevated rails extending longitudinally of said transfer aisle in a horizontal plane at a height from the floor of said transfer aisle sufficient to provide adequate clearance for workmen, lift trucks and the like in said transfer aisle, a pair of rails extending longitudinally of each of said access aisles and elevated from the floor of its respective access aisle in a horizontal plane above said plane of said transfer aisle rails, a carriage comprising a wheeled framework support means, having a rectangular opening therein, a pair of spaced rails on said carriage, means for moving said carriage on said transfer aisle rails and to align said pair of carriage rails with any one of said pairs of access aisle rails on either side of said transfer aisle, a stacker assembly comprising a wheeled support, dolly means supported by said stacker, means for moving said stacker along any one of said pairs of access aisle rails on either side of said transfer aisle and on to and off of said rails on said carriage, means on said stacker assembly for raising and lowering said dolly above and below said rails in said access and transfer aisles to the level of any one of said superposed storage means and to a lowermost position wherein said dolly means may be loaded and unloaded directly from the floor of said access and transfer aisles, said means on said stacker being configured to extend said dolly downwardly through said rectangular opening in said carriage to said lowermost position when said stacker is on said carriage, means for extending said dolly transversely of said stacker assembly into any one of said storage means, at least two of said parallel rows of superposed storage means and the access aisle therebetween being enclosed by walls and a ceiling forming a chamber separating said storage means and the access aisle therebetween from the remaining storage means, access aisles and transfer aisle, one of said walls being adjacent said transfer aisle and having an opening therein through which said stacker may pass, and means for closing said wall opening.